Dec. 21, 1943.    J. P. TARBOX    2,337,072
MELTING FURNACE
Filed Feb. 16, 1942
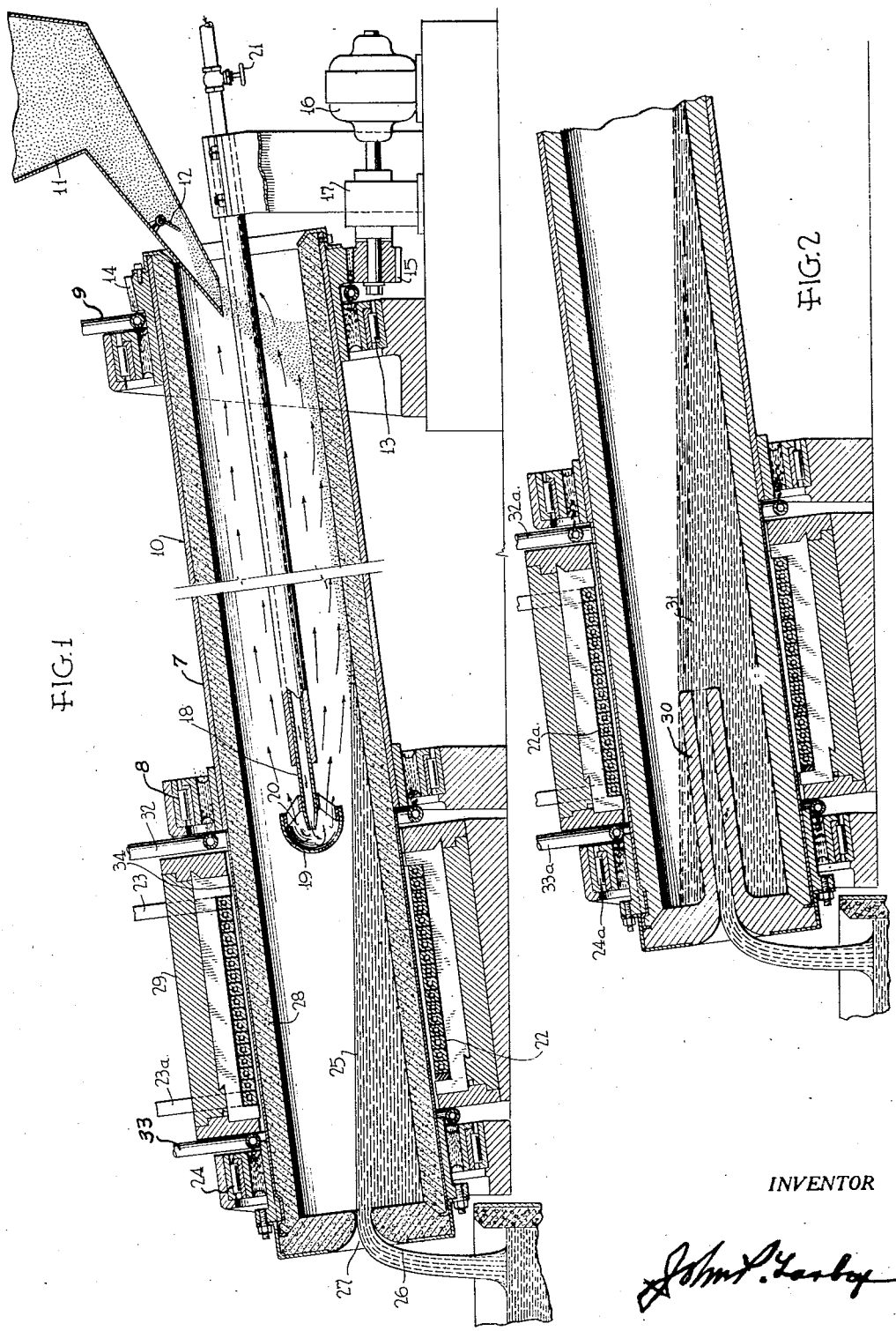
INVENTOR
John P. Tarbox Patented Dec. 21, 1943

2,337,072

UNITED STATES PATENT OFFICE 2,337,072

MELTING FURNACE

John P. Tarbox, Philadelphia, Pa., assignor to Budd Wheel Company, Philadelphia, Pa., a corporation of Pennsylvania Application February 16, 1942, Serial No. 431,028

16 Claims. (Cl. 13—2)

This invention relates to the treatment of scrap metal in conveniently small pieces such as chips, borings, and the like, and has for an object to eliminate the necessity for separate furnaces for preheating and melting such material. Another object is to provide a single furnace for preheating and melting the scrap material, but in which the preheating is performed out of contact with the molten metal in order to remove moisture and combustible materials out of the melting zone. A further object is to simplify, hasten, and cheapen the treatment of melting such scrap material by performing the preheating and melting operations in the same furnace.

Referring to the drawing,

Fig. 1 is a longitudinal view partly in section of one embodiment of this invention; and Fig. 2 shows a detail of a modified construction for the lower or molten end portion of the furnace.

A rotary inclined furnace 10 is shown having a drum 7 of the usual heat-resisting ceramic construction. A supply hopper 11 is provided with an adjustable valve 12 for controlling the rate of discharge of scrap material from the hopper to the furnace, such material being discharged within the upper end portion of the rotary furnace. As is common with rotary inclined furnaces, they are mounted upon anti-friction bearings, the bearings 13 being for the upper end portion of the furnace. A bevel gear 14 surrounds the furnace adjacent the bearings 13 and a co-operating gear 15 is driven by the motor 16 through the reduction gearing within the casing 17. A pipe 18 for liquid or gaseous fuel extends well into the furnace. Adjacent the jet end of the fuel pipe is a reaction wall 19 of heat resistant material of the general shape illustrated so that the upper portion constitutes a reverberatory furnace. The flame 20 from the fuel supply jet is reversed by the wall 19 and directed up the inclined furnace into contact with the downwardly moving scrap material. This results in the hottest part of the flame engaging the material adjacent the reaction wall 19 with the result that any oil or other combustible material mixed with the metal may be ignited and the products of combustion from both the fuel and combustible material in the fed metal continuing up the inclined furnace into contact with the incoming metal. This enables the cooler portions of the flame and products of combustion to preliminarily contact with the scrap metal for removal of any moisture, after which as the scrap material moves down the incline its combustible content is ignited by the flame 20. A valve 21 controls the supply of fuel to the pipe 18 so that the rate of burning may be controlled for the most satisfactory operation. If desired, air or oxygen may be mixed with the fuel inside the pipe 18 or supplied by a separate pipe either within or around the fuel pipe and the oxygen or air supply adjusted by a separate independent valve, not shown, as is well known in the combustion art. The heat imparted to the scrap metal adjacent the lower part of the flame 20 is controlled to give the desired operation to the heating in the upper portion of the furnace. Ordinarily, the scrap metal is flame heated at least as much as half-way or more to its melting temperature.

Below the flame 20 the scrap material is heated by electromagnetic induction to an amount sufficient to cause the material to melt. The inducing coil 22 for such heating is as shown in the drawing made up of conductors each having a cooling fluid passage therein. Such cooling fluid for the inducting conductor may be supplied and removed by the pipes 23 and 23a, either of which may be the inlet pipe and the other the outlet. The lower end portion of the furnace is likewise mounted upon roller bearings 24. The inductive heating is sufficient to effect a rapid melting of the scrap metal as it is continuously moved down the inclined furnace by gravity, so that a pool 25 of molten metal is formed in the lower portion of the furnace. An end wall 26 is provided with an opening 27 through which the molten metal is continuously discharged into some receptacle illustrated for its intended use. The lower end portion of the furnace lining 28 subjected to the inductively heated molten metal is adapted to withstand the high temperatures encountered and for this reason may be of a different and better quality lining from that found in the upper end portion of the inclined furnace. In order to reduce the chilling effect from any excess air or oxygen coming in through the opening 27 in the lower end wall of the furnace, this opening is preferably made as small as is compatable with the amount of molten metal being discharged as well as necessary for supporting combustion in the upper end portion of the furnace should air or oxygen for such upper portion not be supplied in the fuel jet. The most efficient operation requires the air or oxygen needed for combustion in the upper portion of the furnace being supplied through the upper end portion of the furnace along with the fuel in order that the opening in the lower end of the furnace may be as small as possible. Where the continuous rate of feed and discharge of molten metal is varied to a wide extent, it will be found desirable to reduce the excess opening 27 by means of a movable gate of suitable fire-resistant material, such gate not being illustrated because the same is believed to be well known. Surrounding the inducing coil 28 is a series of radial laminations 29 as is customarily mounted adjacent such an inducing conductor. Cooling fluid for the bearings 14, 8 and 24 is supplied through pipes 9, 32 and 33, as shown.

In Fig. 2 is shown substantially the same furnace having the inducing coil 22a and mounted upon the usual anti-friction bearings 24a. The modification illustrated in Fig. 2 includes an inwardly extending passage 30 of suitable heat-resisting material. By means of this inwardly extending passage the level 31 of the molten liquid in the furnace may be considerably raised over what is possible with the construction shown in Fig. 1. The higher the liquid level the more efficient will be the furnace, because the work or molten metal will be brought nearer to all portions of the inducing coil. The construction illustrated in Fig. 2 is otherwise like that described in connection with Fig. 1.

Among the advantages of this invention may be mentioned the elimination of a separate furnace heretofore customarily required in commercial practice for melting the material fed down a rotary inclined preheating furnace. The inductive heating may be adjusted to the rate of feed of the scrap material so as to bring the discharge metal to the desired temperature. The provision of an inductive heater in the lower portion of this furnace not only makes the process simple and convenient but dispenses with the necessity of a large amount of excess air or oxygen being supplied in passing across the molten metal, since such relatively cool gas has a refrigerating effect upon the metal, reducing the efficiency of operation of the furnace. Having the required oxygen or air to support combustion of the flame 20, supplied within or around the pipe 18, makes it unnecessary for this air to be supplied across or over the molten metal.

In the embodiment illustrated the inducing coil is preferably stationary so that the furnace rotates within it, whereby there is no necessity for any collector rings as might otherwise be needed if the coil rotated with the furnace. The current through the inducing coil is of such large value as to make successful use of wiping contacts on collector rings not preferred. Longitudinal strips 34 may be used if desired to hold the furnace lining 28 in place. As these strips are located close to the inducing coil they should be of high heat resistant metal and not peripherally continuous to suppress induced currents circulating therein. Above the metal strips 34 where the heat is not so intense, a thicker metal casing may be used as illustrated. In order to cool the bearings 24a, pipes 32a and 33a, supply fluid under pressure to a peripheral portion from which the fluid is ejected as illustrated through perforations in the furnace support and radially within the roller bearings as shown in Fig. 1 of the drawing. The hot gases passing out through the upper end of the furnace may be led to a stack or hood not shown.

While several applications of the invention have been illustrated and described, it is to be understood that the invention is not limited thereto but may be embodied in various forms as desired. As various changes in construction and arrangement of parts may be made without separating from the spirit of the invention as will be apparent to those skilled in the art, reference will be had to the appended claims for a definition of the limits of the invention.

What is claimed is:

1. A furnace for treating metal scrap comprising a tubular drum, means for supporting the drum rotatably in an inclined position, means for supplying scrap to the upper end of the drum, plural heating means, one of which is electrically inductive for supplying heat at spaced points within said drum, and outlet means in the lower end of the drum and displaced from the edge thereof for causing formation of a pool of molten scrap in the lower end of said drum during furnace operation.

2. A furnace for treating metal scrap comprising a tubular drum, means for supporting the drum rotatably in an inclined position, means for supplying scrap to the upper end of the drum, plural heating means, one of which is electrical for supplying heat at spaced points within said drum, and outlet means for causing formation of a pool of molten scrap during furnace operation, said outlet means including a conduit opening on the lower end of the drum and extending to a point within said drum.

3. A furnace for treating metal scrap comprising a tubular drum having a single chamber, means for supporting the drum rotatably in an inclined position, means for supplying scrap to the upper end of the drum, plural heating means, one of which is electrical for supplying heat at spaced points within said drum, and outlet means for causing formation of a pool of molten scrap in said chamber during furnace operation, the height of the inlet of said outlet means above the lowermost point of the interior of said drum, and the inclination of said drum, being such as to develop in furnace operation a pool area bridging the plural heating means.

4. A furnace for treating metal scrap comprising a tubular drum, means for supporting the drum rotatably in an inclined position, means for supplying scrap to the upper end of the drum, heating means for supplying heat within said drum and an axially entrant outlet extending from the lower end of the drum.

5. A furnace for treating metal scrap comprising a tubular drum, means for supporting the drum rotatably in an inclined position, means for supplying scrap to the upper end of the drum, upper and lower heating means within said drum for supplying pre-heating and melting heat to scrap moving down the incline of the drum, the upper heating means comprising an entrant pipe, a terminating nozzle, and a reversing wall in line with and adjacent said nozzle for reversing the direction of fluid flow.

6. A furnace for treating iron-containing metal scrap comprising a tubular drum, means for supporting the drum rotatably in an inclined position, means for supplying scrap to the upper end of the drum, outlet means displaced inwardly of the lower end of said drum for insuring molten pool form of scrap within the lower section of said drum, and electrically inductive means for heating the lower section of said drum.

7. A furnace for treating metal scrap comprising a tubular drum, means for supporting the drum rotatably in an inclined position, means for supplying scrap to the upper end of the drum, a conduit for removing molten scrap from the lower end of the drum, and plural heating means, including an electrical inductive heater adjacent the lower end of said drum for heating said scrap, said heating means being fixed in position.

8. A furnace for treating iron-containing metal scrap comprising a tubular drum, means for supporting the drum rotatably in an inclined position, means for supplying scrap to the upper end of the drum, and means for imparting heat to said scrap in percentages approaching uniformity during the movement of said scrap through the lower section of the drum.

9. A furnace for treating iron-containing metal scrap comprising a tubular drum, means for supporting the drum rotatably in an inclined position, means for supplying scrap to the upper end of the drum, and means for imparting heat to said scrap in the lower section of said drum in amounts varying roughly in proportion to the vertical depth of the scrap.

10. A furnace for treating iron-containing metal scrap comprising a single tubular drum, means for supporting the drum in an inclined position, means for supplying scrap to the upper end of the drum, means for heating the scrap in the upper section of the drum, additional means for heating and electrically agitating the scrap in the lower section of said drum and mechanical means for agitating the scrap in both upper and lower drum sections 11. A furnace for treating metal scrap comprising a tubular drum, means for supporting the drum rotatably in an inclined position, means for supplying scrap to the upper end of the drum, upper and lower heating means within said drum for supplying pre-heating and melting heat to scrap moving down the incline of the drum, the upper heating means comprising a jet approximately centrally positioned within said furnace, and a supply pipe extending from said jet to the upper end of the furnace, and means for directing the fuel from said jet along the incoming scrap in a direction toward the upper end of the drum.

12. A method of treating scrap comprising the steps of moving said scrap down a continuous decline while subjecting it to mechanical agitation, applying heat to the upper section of the declining scrap to pre-heat and dry the same, applying heat to the lower section of the scrap to melt the same, and bridging the two sections with an area of molten scrap whereby heat may be supplied continuously throughout the length of said decline.

13. A furnace for treating iron-containing metal scrap comprising a single tubular drum, means for supporting the drum rotatably in an inclined position, means for supplying scrap to the upper end of the drum, and means for imparting heat to said scrap in percentages approaching uniformity during the movement of said scrap through the lower section of the drum, said means including an electric inductive coil enclosing the lower drum section.

14. A furnace for treating iron-containing metal scrap comprising a single tubular drum, means for supporting the drum rotatably in an inclined position, means for supplying scrap to the upper end of the drum, and means for imparting heat to said scrap in the lower section of said drum in amounts varying roughly in proportion to the vertical depth of the scrap, said means including an electric inductive coil enclosing the lower drum section.

15. A furnace for treating metal scrap comprising a single tubular drum, means for supporting the drum rotatably in an inclined position, means for supplying scrap to the upper end of the drum, a conduit for removing molten scrap from the lower end of the drum, and heating means for the lower section of said drum comprising an inductive coil surrounding said lower drum section but fixedly supported independently of said drum whereby the heating effect of the molten scrap within the drum is relatively uniform.

16. A method of treating scrap comprising the steps of moving said scrap down a continuous decline while subjecting it to mechanical agitation, applying heat to the upper section of the declining scrap to pre-heat and dry the same, and applying electromagnetic induction to the lower section of the scrap to melt the same and produce electromagnetic agitation therein.

JOHN P. TARBOX.